United States Patent [19]

Sieren

[11] Patent Number: 4,491,191
[45] Date of Patent: Jan. 1, 1985

[54] ADJUSTABLE TRACTOR GRILLE SHELL

[75] Inventor: Gerald E. Sieren, Greendale, Wis.

[73] Assignee: Allis-Chalmers Corp., Milwaukee, Wis.

[21] Appl. No.: 454,198

[22] Filed: Dec. 29, 1982

[51] Int. Cl.³ .............................................. B62D 25/10
[52] U.S. Cl. .................................... 180/69.2; 296/194
[58] Field of Search ................. 180/69.2, 69.22, 69.23, 180/69.25, 89.17, 68.6, 69.21; 296/194; 293/115

[56] References Cited

U.S. PATENT DOCUMENTS 1,346,325  7/1920  McKinley ......................... 180/69.2
1,732,964 10/1929  Cammer .......................... 180/69.25
3,918,540 11/1975  Haupt ............................. 180/69.2

FOREIGN PATENT DOCUMENTS 2702130  7/1978  Fed. Rep. of Germany ... 180/69.21

Primary Examiner—Joseph F. Peters, Jr.
Assistant Examiner—Joseph G. McCarthy
Attorney, Agent, or Firm—Arthur L. Nelson

[57] ABSTRACT

An adjustable tractor grille shell for aligning the vertical edges of the engine hood and side panels with the grille shell on the tractor.

8 Claims, 6 Drawing Figures

ADJUSTABLE TRACTOR GRILLE SHELL

This invention relates to an engine hood and more particularly to an adjustable grille shell for aligning the engine hood center panel and side panels with the grille shell.

The engine hood of a tractor is usually equipped with side panels which are hinged or completely removable to allow for servicing of the engine. The center hood panel provides a supporting means for the side panels which are usually hinged at the top. Alignment of the forward ends of the side panels and the center hood panel with the grille shell is necessary because any misalignment is readily apparent to the eye. Accordingly, some adjustable means is necessary whereby alignment between these panels can be provided.

Applicant has provided for adjustment of the center hood panel fore and aft and an angular adjustment between the center hood panel and the grille shell to provide the desired alignment between the center hood and the side panels and the grille shell. Essentially, it provides a horizontal adjustment at the rear of the center hood panel and an angular adjustment between the center hood panel and the top of the grille shell as well as an adjustable fastening means at the lower end of the grille shell. This provides adjustment for spacing between the engine hood and the grille shell and also an angular adjustment to assure even spacing between the grille shell and the center hood panel as well as the side panels.

The Haupt patent, U.S. Pat. No. 3,918,540, shows a grille structure and side panels on an engine hood. The patent is primarily related to mounting of removable side panels on the center hood panel and the provision of latching means to fasten the side panels in their operating position. Applicant's invention provides for a pivotal structure between the center hood panel and side panels with the grille shell to assure that the spacing and angularity between these panels is provided during assembly of the engine hood.

It is an object of this invention to provide adjustment between the center panel and side panels of an engine hood and a grille shell to assure alignment of the panels.

It is another object of this invention to provide an engine hood structure wherein the hood center panel and side panels can be adjusted horizontally and angularly relative to the grille shell on an engine hood.

It is a further object of this invention to provide an engine hood having a center panel providing pivotal support for side panels with a horizontal adjustment and an angular adjustment of the center panel relative to the grille shell to assure alignment of the panels on the engine hood.

The objects of this invention are accomplished through an engine hood having a center hood panel pivotally supporting side panels through hanger structure for removably hanging the side panels. The grille structure on the forward end of the center panel and the side panels is provided for angular adjustment between the grille shell and the panels. A horizontal adjustment between the supporting structure for the center hood panel allows fore and aft movement of the center panel and side panels. This provides an even spacing between the panels and the grille shell to assure a good appearance of the panel positioning on the engine hood.

The preferred embodiments of this invention are illustrated in the attached drawings.

Figure 1:
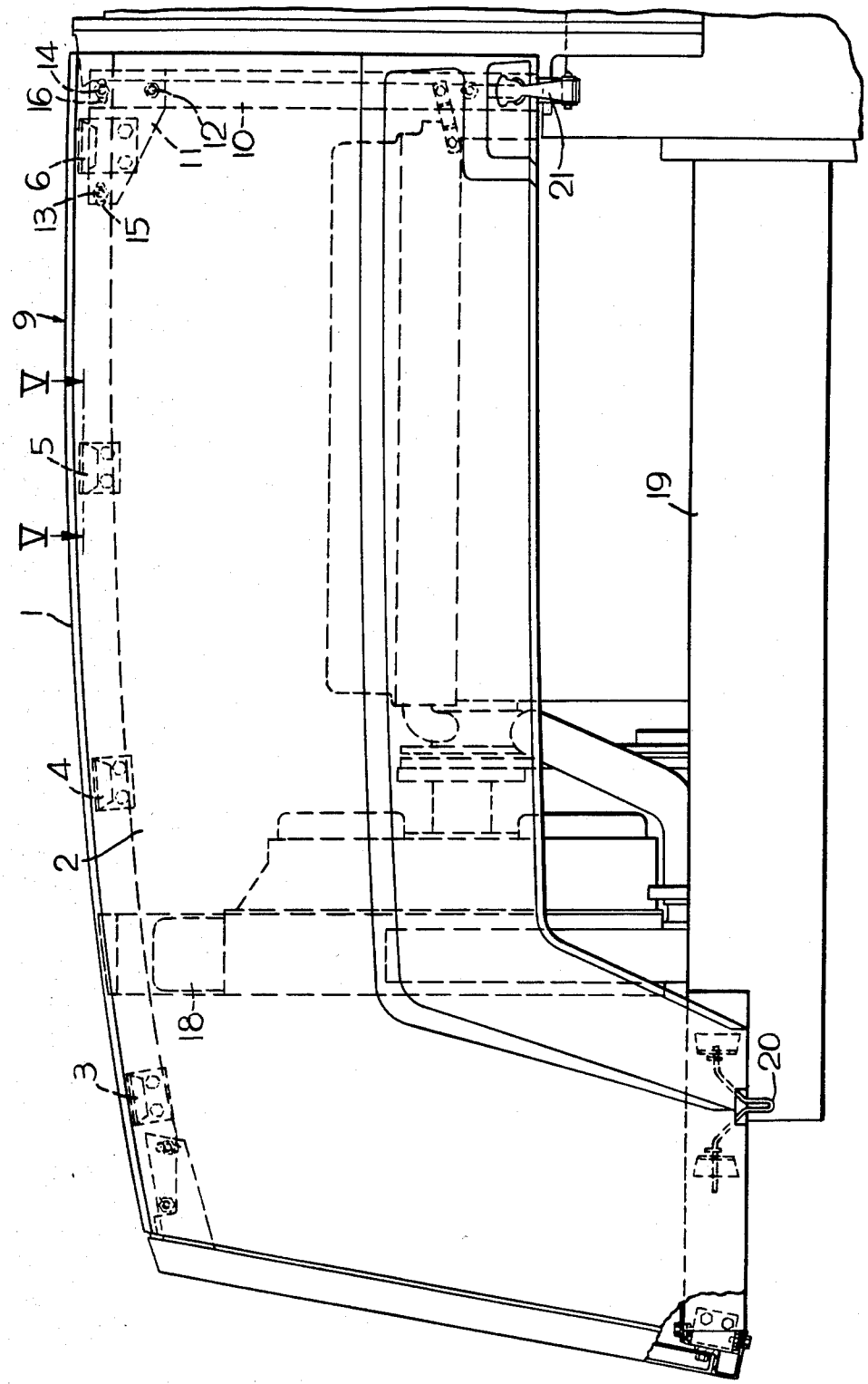
FIG. 1 illustrates a side elevation view of the engine hood.
Figure 2:
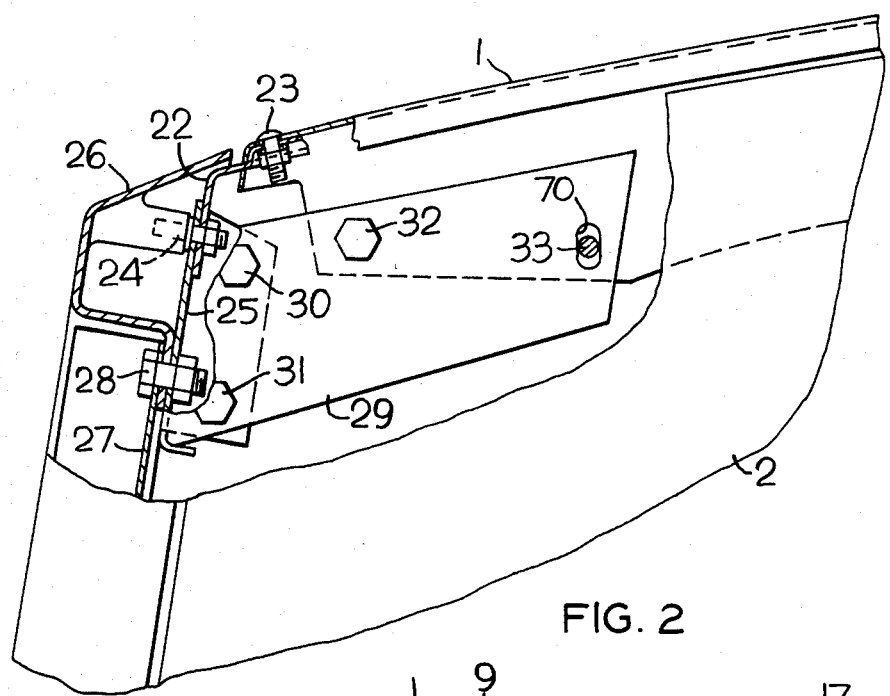
FIG. 2 is a fragmentary cross-section view of the connection between the center panel and side panels with the grille shell.
Figure 3:
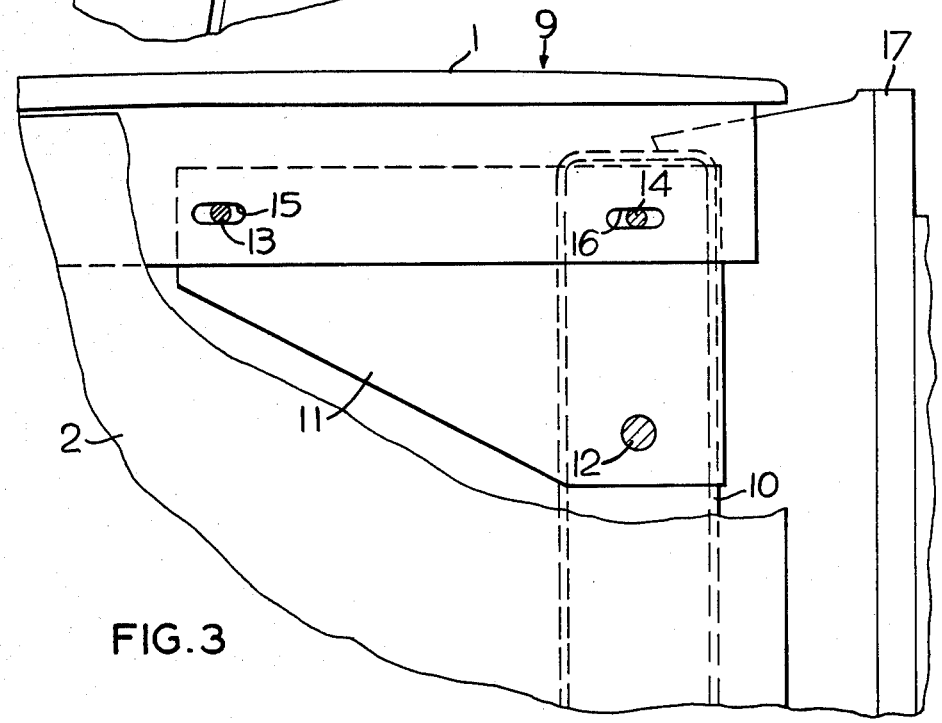
FIG. 3 illustrates a fragmentary view showing the rear supporting structure for the center panel of the engine hood.
Figure 5:
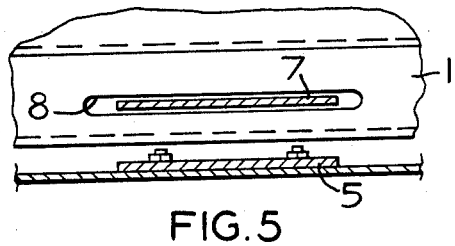
FIG. 5 is a cross-section view taken on line V—V of FIG. 1.

Referring to the drawings, FIG. 1 shows the center hood panel 1 supporting the side panel 2 through the brackets 3, 4, 5, 6. Brackets 3, 4, 5, 6 are fastened to the side panel 2 and have a hook structure 7 shown in FIG. 5 which extends downwardly through an opening 8 in the center hood panel 1 of the engine hood 9. The center hood panel 1 is supported on the pillar 10 carrying the bracket 11 fastened by means of bolts 12, 14. The bracket 11 is equipped with the bolts 13, 14 which extend through elongated openings 15, 16 in the center hood panel 1. The bolts 13, 14 allow for horizontal movement of the center hood panel 1 relative to the bracket 11 and pillar 10 allowing a horizontal adjustment between these members.

The forward end of the shroud forming fire wall 17 extends forwardly into the engine hood 9. The forward end of the center hood panel 1 is supported on the radiator 18 which is carried on the vehicle chassis 19. The lower edges of the side panels of which panel 2 is shown are fastened by the latches 20, 21. The latch 20 can compensate for any horizontal or longitudinal adjustment made on the engine hood 9 relative to the vehicle chassis 19. The panel 2 is more fully shown in the copending patent application, Ser. No. 335,594, to the same inventor, entitled "Side Panel for Engine Hood".

The latch 21 is constructed of a rubber body pivotally mounted on the vehicle chassis which is extended to latch the rear end of the panel 2, and accordingly, also has compensation for any adjustment which may be made on the panel 2.

The forward end of the center hood panel 1 is connected through the front hood support panel 22 which is bolted at the center of the center hood panel 1 by a bolt 23. The front hood support panel 22 is also bolted by a bolt 24 to the grille top support 25 and to the grille shell 26. Grille shell 26 is fastened to the grille 27 by a plurality of bolts 28.

The grille top support 25 is fastened through bolts 30, 31 to the center hood brace 29. The center hood brace 29 extends rearwardly and upwardly to fasten to the hood center panel 1 by means of the bolts 32, 33. It is noted that the bolt 33 extends through a slotted vertical opening 70 which allows the grille shell 26 to pivot relative to the hood center panel 1. Angular adjustment is provided between these two members before the nut is tightened on the bolt 33.

Figure 4:
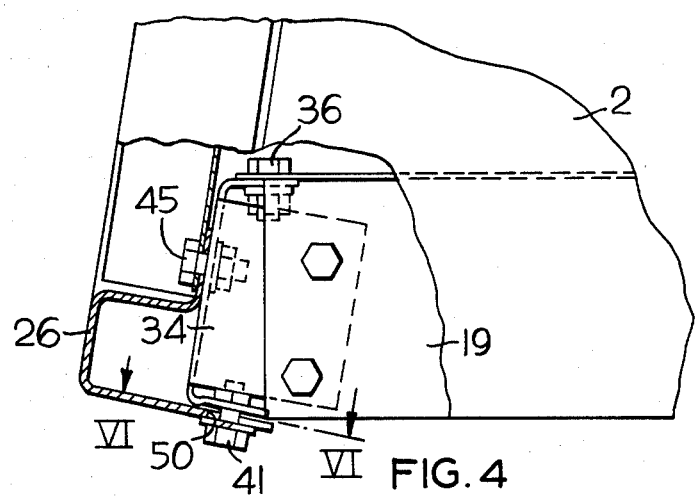
FIG. 4 illustrates a fragmentary cross-section view of the front lower end of the engine hood showing the connection with the grille shell with the vehicle chassis.
Figure 6:
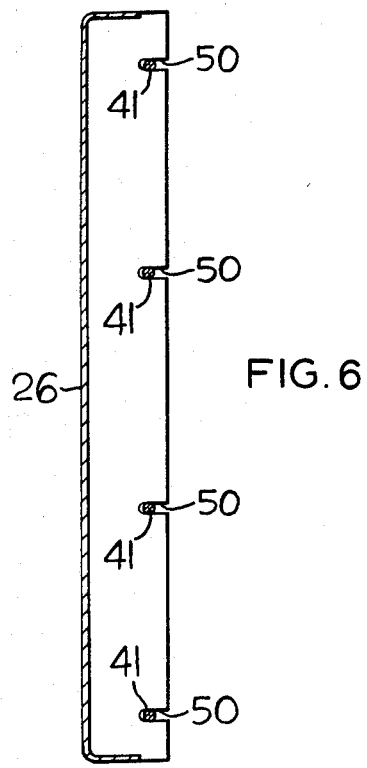
FIG. 6 is a cross-section view taken on line VI—VI of FIG. 4.

Referring to FIGS. 4 and 6, the lower end of the grille shell 26 is fastened through a grille support 34. The grille support 34 is fastened by the bolt 36 to the chassis 19. Grille shell 26 is also fastened to the grille support 34 by means of the bolt 45. It is noted that a measure of adjustment is provided in the grille support 34 as shown in FIG. 6 in which the bolts 41 are allowed to slide in the slots 50. This provides adjustment at the lower end of the grille shell relative to the vehicle chassis. The operation of this device will be described in the following paragraphs.

Assembly of the center hood panel 1 is accomplished by positioning the panel on the rear support including the pillar 10 and bracket 11. The bolts 13, 14 are positioned in the openings 15, 16 but they are not at this time securely fastened to the center hood panel 1.

The center hood panel 1 is then fastened to the grille shell 26 and grille top support 25 through the front hood support bracket 22. The bolts 23, 24 are fastened to the front hood support panel 22 to carry the grille shell 26. The center hood brace 29 is fastened to the grille top support 25 by means of bolts 30, 31 and also fastened by the bolts 32, 33 to the center hood panel 1. Bolts 32, 33 are not tightened at this time.

Alignment of the grille shell 26 is made by shifting the center hood panel horizontally and an angular adjustment through the bolt 33 between the center hood brace 29 and the center hood panel 1. This angularly adjusts the grille shell 26 relative to the center hood panel 1. With the proper alignment, by providing an even spacing between the side panels 2 and the center hood panel 1 with the grille shell 26, the bolts 13, 14 are tightened as well as the bolts 32, 33. This fixes the position of the grille shell 26 relative to the center hood panel 1 and the side panels 2 making a good alignment between the panels and assuring that they will remain in position. The bolts 41, 36, 45 are also tightened to maintain the position of the grille support 34 and the grille shell 26 relative to the chassis 19.

The embodiments of this invention in which an exclusive property or privilege is claimed are defined as follows:

1. An engine hood on a motor vehicle comprising, a center hood panel, a side panel supported on each side of said center hood panel, a rear hood support supporting the rear end of said center hood panel, a front hood support means supporting said center hood panel, a grille means including a grille shell carrying a grille, grille fastening means connecting said grille shell with the front end of said center hood panel, grille shell adjusting means including horizontal adjusting means for adjustably positioning said center hood panel horizontally relative to said rear hood support and angular adjusting means angularly adjusting the grille shell relative to said center hood panel thereby providing adjustment between said grille shell and said center hood panel and said side panels for aligning of said panels relative to said grille shell.

2. An engine hood on a motor vehicle as set forth in claim 1 including, a vehicle chassis supporting said rear hood support and said front hood support means, latching means for latching said side panels to said vehicle chassis.

3. An engine hood on a motor vehicle as set forth in claim 1 wherein, said horizontal adjusting means includes horizontal slots and bolts for fastening said center hood panel on said rear hood support, said angular adjusting means comprising means defining vertical slot means and bolts for adjustably fastening said hood center panel to said grille shell for providing angular adjustment between said center hood panel and said grille shell.

4. An engine hood on a motor vehicle as set forth in claim 1 wherein, said angular adjusting means includes adjustable fastening means on the top of said grille shell and at the bottom of said grille shell to provide relative adjustment between said center hood panel and said grille shell.

5. An engine hood on a motor vehicle as set forth in claim 1 wherein, said center hood panel defines horizontal slots, said rear hood support carries bolts for fastening said support means to said center hood panel.

6. An engine hood on a motor vehicle as set forth in claim 1 wherein, said front hood support means defines a radiator.

7. An engine hood on a motor vehicle as set forth in claim 1 including, means removably hanging said side panels on said center hood panel.

8. An engine hood on a motor vehicle as set forth in claim 1 including, a chassis, said angular adjusting means includes an adjustment at the bottom of said grille shell and said chassis.

* * * * *